US008786960B2

(12) United States Patent
Lin et al.

(10) Patent No.: US 8,786,960 B2
(45) Date of Patent: Jul. 22, 2014

(54) PROJECTION APPARATUS

(75) Inventors: Ming-Kuen Lin, Yunlin County (TW); Tsung-Hsun Wu, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 92 days.

(21) Appl. No.: 13/478,121

(22) Filed: May 23, 2012

(65) Prior Publication Data
US 2012/0300296 A1 Nov. 29, 2012

(30) Foreign Application Priority Data
May 23, 2011 (TW) .............................. 100117915 A

(51) Int. Cl.
*G02B 13/18* (2006.01)
(52) U.S. Cl.
CPC ..................................... *G02B 13/18* (2013.01)
USPC ........................... 359/708; 359/434; 359/721
(58) Field of Classification Search
USPC ............ 353/80–101; 359/362–435, 443–461, 359/554–557, 642–830
See application file for complete search history.

(56) References Cited

U.S. PATENT DOCUMENTS

| 8,363,318 B2 * | 1/2013 | Lin et al. ....................... 359/434 |
| 2006/0193036 A1 * | 8/2006 | Suzuki ........................... 359/364 |
| 2008/0192208 A1 * | 8/2008 | Benoit et al. ..................... 353/85 |
| 2010/0172022 A1 * | 7/2010 | Lin et al. ........................ 359/434 |
| 2010/0232039 A1 * | 9/2010 | Chen et al. ..................... 359/728 |
| 2011/0002051 A1 * | 1/2011 | Hsu et al. ....................... 359/717 |

FOREIGN PATENT DOCUMENTS

| CN | 101149465 A | 3/2008 |
| CN | 101324700 A | 12/2008 |
| CN | 101373259 A | 2/2009 |
| CN | 101377565 A | 3/2009 |
| CN | 101556424 A | 10/2009 |

* cited by examiner

*Primary Examiner* — Thomas K Pham
*Assistant Examiner* — Collin X Beatty

(57) ABSTRACT

The present invention provides a projection apparatus including an image generation device and a projection lens. The image generation device has a light valve, and generates a light. The projection lens includes a first lens group having an optical axis and a second lens group disposed between the first lens group and the light valve. The light generated from the light valve penetrates through the second lens group and forms an intermediate image between the first lens group and the second lens group. The intermediate image penetrates through the first lens group to form a projection image. A center of the projected image and a center of the light valve are disposed at a first side of the optical axis, and a center of the intermediate image is disposed at a second side of the optical axis different from the first side.

14 Claims, 5 Drawing Sheets

PROJECTION APPARATUS

BACKGROUND OF THE INVENTION

1. Field of the Invention

The present invention relates to a projection apparatus, and more particularly, to a projection apparatus having a projection lens with two-time image formation.

2. Description of the Prior Art

To project an image at a big space such as a big conference room or a hall, a bigger projection image is required so that the observer can clearly see the image. However, the size of the projection image of the projection apparatus is subject to the structural design of the projection lens. Thus, a wide-angle projection lens is commonly used in the projection apparatus. Conventionally, the design of the wide-angle projection lens is based on a technology of one-time image formation, which would normally lead to the problems such as the front lens group being too big so as to increase the manufacturing cost and difficulty for manufacturing the projection lens. Accordingly, a projection lens utilizing a mirror disposed off an optical axis or a projection lens having a lens with a specific lens surface has been developed to shorten a projection distance. However, the projection lens utilizing a mirror disposed off an optical axis has more instability, and the size of the mirror is too large so that difficulty for manufacturing the projection lens is increased, and the projection lens is not easily accepted in this field.

SUMMARY OF THE INVENTION

It is therefore an objective of the present invention to provide a projection apparatus to solve the above-mentioned problem of the increase of the manufacturing cost and manufacturing difficulty.

According to a preferred embodiment of the present invention, a projection apparatus used to project an image on a projection screen is provided. The projection apparatus includes an image generation device and a projection lens. The image generation device generates a light with the image, and the image generation device has a light valve. The light emits out from the light valve. The projection lens includes a first lens group and a second lens group. The first lens group has an optical axis and a first effective refractive index, and the first lens group includes a plurality of first lenses, wherein the first lenses comprises two first aspherical lenses. The second lens group has a second effective refractive index, and the second lens group is disposed between the first lens group and the light valve. The light generated from the light valve penetrates through the second lens group and forms an intermediate image between the first lens group and the second lens group, and the intermediate image penetrates through the first lens group to form a projection image on the projection screen. A center of the projection image and a center of the light valve are disposed at a first side of the optical axis, and a center of the intermediate image is disposed at a second side of the optical axis. The second side is different from the first side.

The projection apparatus of the present invention uses the design of two-time image formation to form an upright projection image, and the first lens group and the second lens group are disposed on the same optical axis, so that the instability generated from the mirror being disposed off the optical axis can be avoided. Furthermore, the first lens group in the present invention further includes at least two aspherical lenses to avoid the problems of the front lens group being too big and the total length of the projection lens being increased rapidly.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention, preferred embodiments will be detailed as follows. The preferred embodiments of the present invention are illustrated in the accompanying drawings with numbered elements to elaborate the contents and effects to be achieved.

Figure 1:
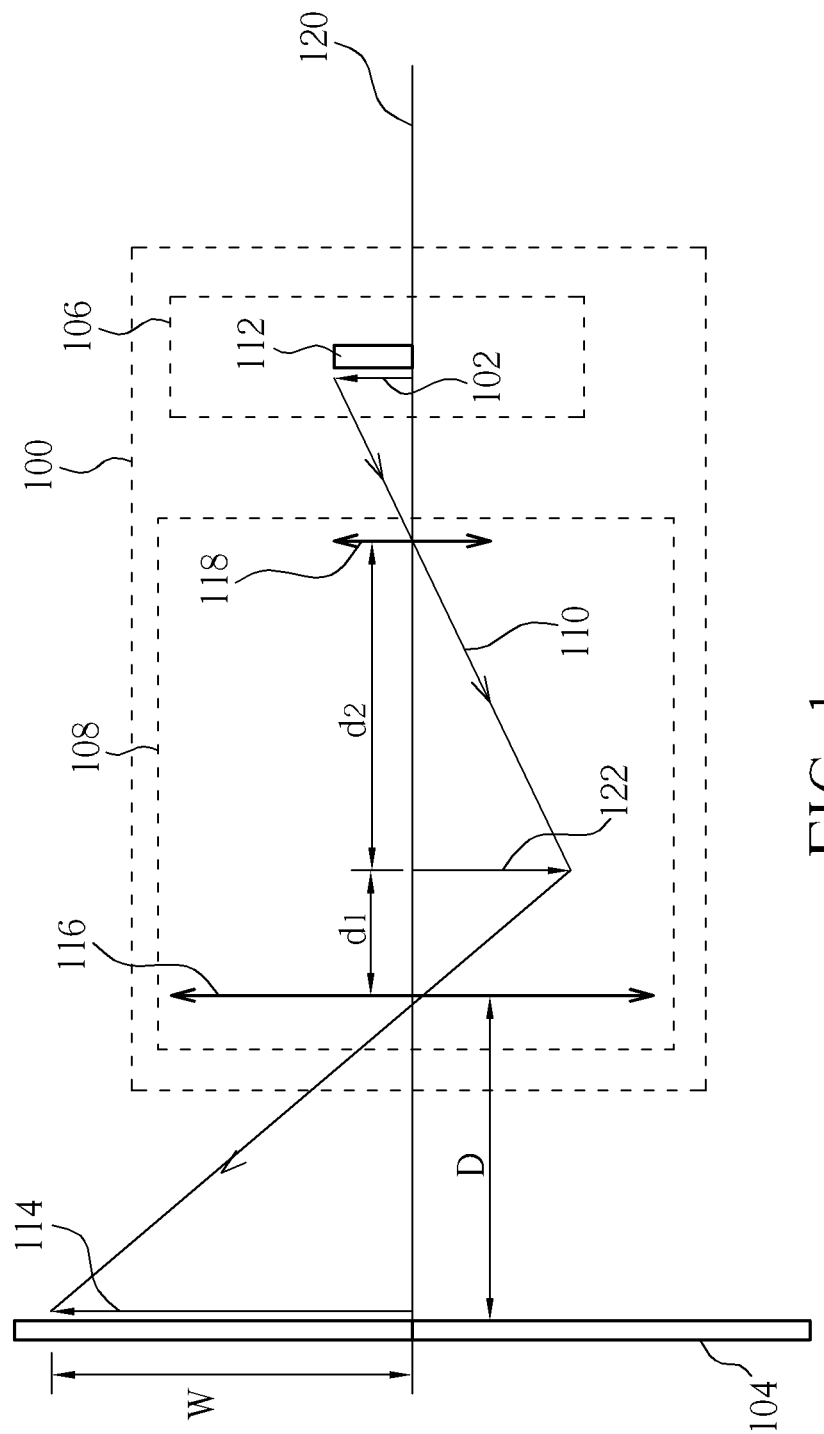
FIG. 1 is a schematic diagram illustrating a projection apparatus having two-time image formation.

Please refer to FIG. 1, which is a schematic diagram illustrating a projection apparatus having two-time image formation. As shown in FIG. 1, the projection apparatus 100 is used to projection an image 102 onto a projection screen 104, and the projection apparatus 100 includes an image generation device 106 and a projection lens 108. The projection lens 108 is disposed between the projection screen 104 and the image generation device 106. The image generation device 106 can be a light engine including light source and several kinds of optical devices, and is used to generate a light 110 with the image 102. The image generation device 106 has a light valve 112, so that the light 110 emits out from the light valve 112 and into the projection lens 108. The light 110 is projected onto the projection screen 104 by the projection lens 108 to form an enlarged projection image 114 on the projection screen 104. The light valve of the present invention can be an LCD panel or a digital micro-mirror device (DMD), but is not limited herein. Furthermore, the projection lens 108 includes a first lens group 116 and a second lens group 118. The first lens group 116 has an optical axis 120. The second lens group 118 is disposed on the optical axis 120 and between the first lens group 116 and the light valve 112, and the second lens group 118 uses the optical axis 120 as its optical axis. The light 110 generated from the image generation device 106 penetrates through the second lens group 118, and an intermediate image 122 is generated between the first lens group 116 and the second lens group 118. The intermediate image 122 penetrates through the first lens group 106, and is projected onto the projection screen 104 to form the projection image 114. Furthermore, the image generation device 106 is disposed at a first side of the optical axis 120, so that an upside-down intermediate image 122 is formed at a second side of the optical axis 120 by the light 110 with the upright image 102 generated from the image generation device 106 and penetrates through the second lens group 118, and the second side is different from the first side. Furthermore, the intermediate image 122 could penetrate the first lens group 116 to form upright projection image 114 on the projection screen 104. Thus, a center of the projection image 114 imaged on the projection screen 104 and a center of the light valve 112 are disposed at the first side of the optical axis 120, and a center of the intermediate image 122 is disposed at the second side opposite to the first side. Accordingly, the projection apparatus 100 of the present invention uses the design of two-time image formation to image the upright projection image 102 generated from the image generation device 106 onto the projection screen 104 to form the upright projection image 114. In this embodiment, the first lens group 116 is a wide angle lens set of the projection lens, and the second lens group 118 is a relay lens set of the projection lens.

In the present invention, a distance $d_1$ between the intermediate image 122 and the first lens group 116 is less than a distance $d_2$ between the intermediate 122 and the second lens group 118. An effective focal length of the projection lens 108 of the present invention is fe satisfying a relationship expressed by: 2 mm≤fe≤7 mm. A projection view angle of the projection lens 108 is larger than 120 degrees, but the present invention is not limited herein. It should be noted that the first lens group 116 includes at least two aspherical lenses, and an effective focal length of the first lens group 116 is fw satisfying a relationship expressed by: fw/fe≤2.5. When fe is less than a lower limit of 2 mm, the size of the first lens group 116 serving as the wide angle lens set is too large so as to increase difficulty in design and manufacturing cost. When fe is larger than an upper limit of 7 mm, an effect of super wide angle can be achieved by a lens with one-time image formation. When fw/fe>2.5, the total length of the projection lens 100 would be increased rapidly, so that the manufacturing cost is raised and assembly of the system is not comfortable. Thus, in combination with the relationships in the present invention, the problem of the front lens close to the projection screen 104 being too large can be solved by disposing at least two aspherical lenses in the first lens group 116 serving as wide angle lens set, and the manufacturing cost can be avoided from increasing. Furthermore, the increase of manufacturing cost and an inconvenience of assembling the projection apparatus 100 first lens group 116 resulted from the total length of the projection lens 108 rapidly being increased can be avoided by disposing at least two aspherical lenses in the first lens group 116.

In addition, a distance between the projection lens 108 and the projection screen is D, and a width of the projection screen 104 is W satisfying a relationship expressed by: D/W≤1. For example, when the distance D between the projection lens 108 and the projection screen 104 is 1 m, the image can be projected onto the projection screen with a width of 100 cm.

Figure 6:
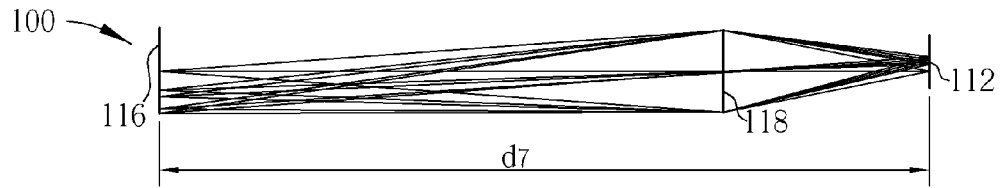
FIG. 2 through FIG. 6 are schematic diagrams illustrating positions of the first lens group having different effective focal lengths fw when the effective focal length fe of the projection lens is fixed to be 3 mm.
Figure 5:
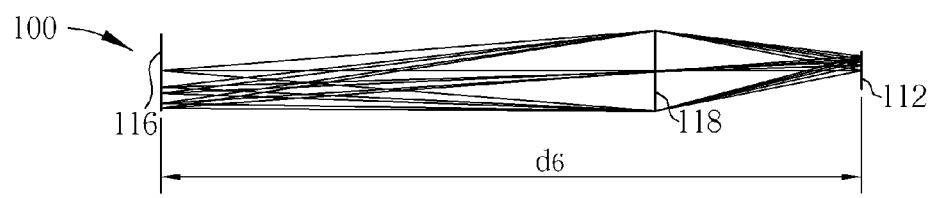
Figure 4:
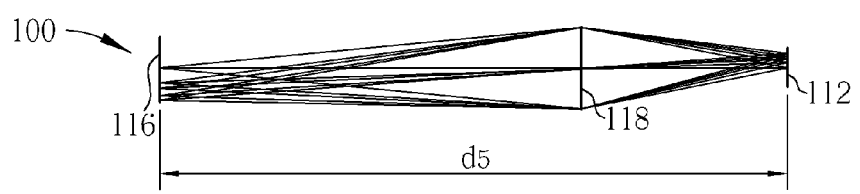
Figure 3:
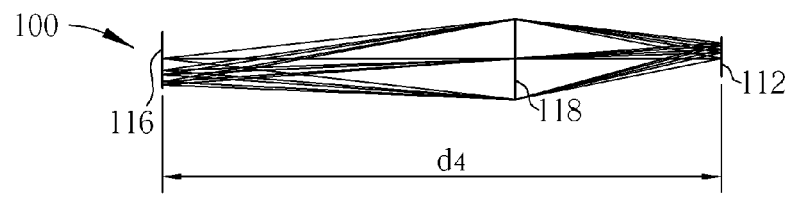
Figure 2:
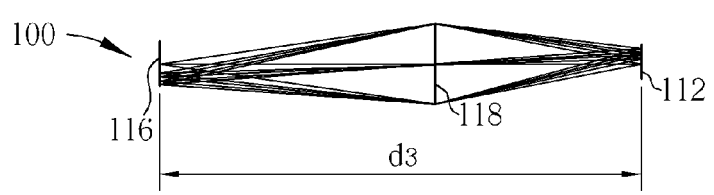

In order to detail the effect of the projection lens 108 of the present invention, please refer to FIG. 2 through FIG. 6 together with Table 1. FIG. 2 through FIG. 6 are schematic diagrams illustrating positions of the first lens group having different effective focal lengths fw when the effective focal length fe of the projection lens is fixed to be 3 mm. As shown in FIG. 2, when the effective focal length fw of the first lens group 116 is 4 mm, and the effective focal length fe of the projection lens 108 is 3 mm, a total length $d_3$ from the light valve 112 to the first lens group 116 is substantially 250 mm. As shown in FIG. 3, when the effective focal length fw of the first lens group 116 is 5 mm, and the effective focal length fe of the projection lens 108 is still 3 mm, a total length $d_4$ from the light valve 112 to the first lens group 116 is substantially 304 mm. As shown in FIG. 4, when the effective focal length fw of the first lens group 116 is 6 mm, and the effective focal length fe of the projection lens 108 is 3 mm, a total length $d_5$ from the light valve 112 to the first lens group 116 is substantially 355 mm. As shown in FIG. 5, when the effective focal length fw of the first lens group 116 is 7 mm, and the effective focal length fe of the projection lens 108 is 3 mm, a total length $d_6$ from the light valve 112 to the first lens group 116 is substantially 406 mm. As shown in FIG. 6, when the effective focal length fw of the first lens group 116 is 8 mm, and the effective focal length fe of the projection lens 108 is 3 mm, a total length $d_7$ from the light valve 112 to the first lens group 116 is substantially 457 mm, and the projection lens 108 in this case is too long, so that the manufacturing cost is increased, and the assembly of the projection apparatus is not convenient.

TABLE 1

| Total length (mm) | 250 | 304.9 | 355.9 | 406.9 | 457.9 |
|---|---|---|---|---|---|
| fe (mm) | 3 | 3 | 3 | 3 | 3 |
| fw (mm) | 4 | 5 | 6 | 7 | 8 |
| fr (mm) | 25 | 93.731 | 99.980 | 104.978 | 109.068 |

The abbreviation "fr" represents the effective focal length of the second lens group 118. According to the above-mentioned datum, when the effective focal length fw of the first lens group 116 increases, the increase of the total length ($d_3$~$d_7$) from the light valve 112 to the first lens group 116 is farther than the increase of the effective focal length fw of the first lens group 116. When the effective focal length fw of the first lens group 116 increases only 4 mm, the total length ($d_3$~$d_7$) from the light valve 112 to the first lens group 116 becomes almost double. The effective focal length fe of the projection lens 108 in the present invention is subject to satisfy the relationship expressed by: 2 mm≤fe≤7 mm, and the effective focal length fw of the first lens group 116 and the effective focal length fe of the projection lens 108 is subject to satisfy the relationship expressed by: fw/fe≤2.5, so that the projection apparatus 100 can have super wide angle when the size of the image generation device 106 is limited. Also, the problem of the front lens group being too large and the total length being increased rapidly can be avoided.

Figure 7:
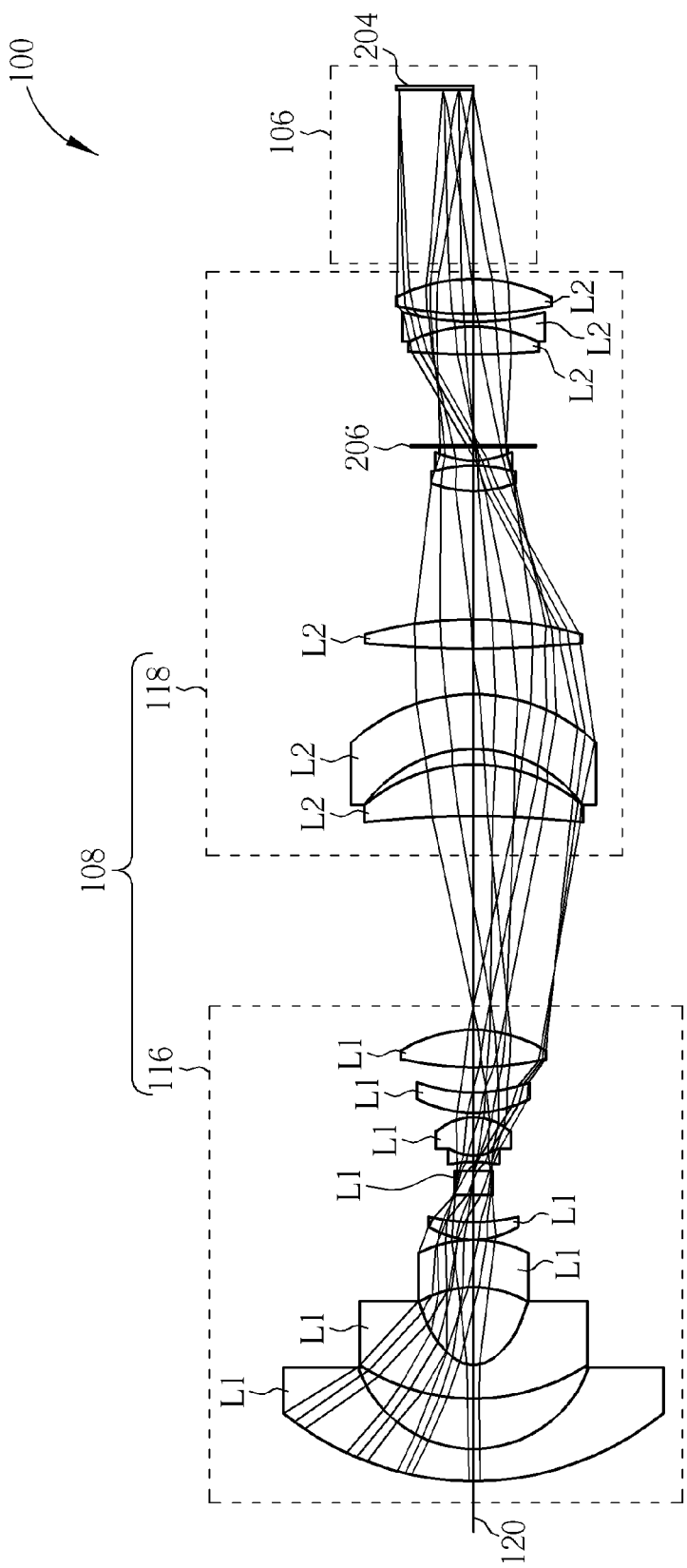
FIG. 7 is a schematic diagram illustrating a projection apparatus according to a preferred embodiment of the present invention.

The projection apparatus of the present invention is further detailed in the following description. Please refer to FIG. 7, which is a schematic diagram illustrating a projection apparatus according to a preferred embodiment of the present invention. As shown in FIG. 7, the image generation device 106 of this embodiment includes a digital micro-mirror device 204, and the digital micro-mirror device 204 can serve as the light valve 112, but the present invention is not limited herein. In this embodiment, a size of the digital micro-mirror device 204, for example a length of a diagonal line, is 0.65 inches, but is not limited thereto. In addition, the first lens group 116 includes a plurality of first lenses L1, and the second lens group 118 includes a plurality of second lenses L2, and an aperture stop 206. The aperture stop 206 is utilized to control a flux of the light with the image 102. The first lens group 116 has a first effective refractive index, and the second lens group 118 has a second effective refractive index. In this embodiment, the first effective refractive index is a first positive effective refractive index, and the second effective refractive index is a second positive effective refractive index, but the present invention is not limited herein.

Figure 8:
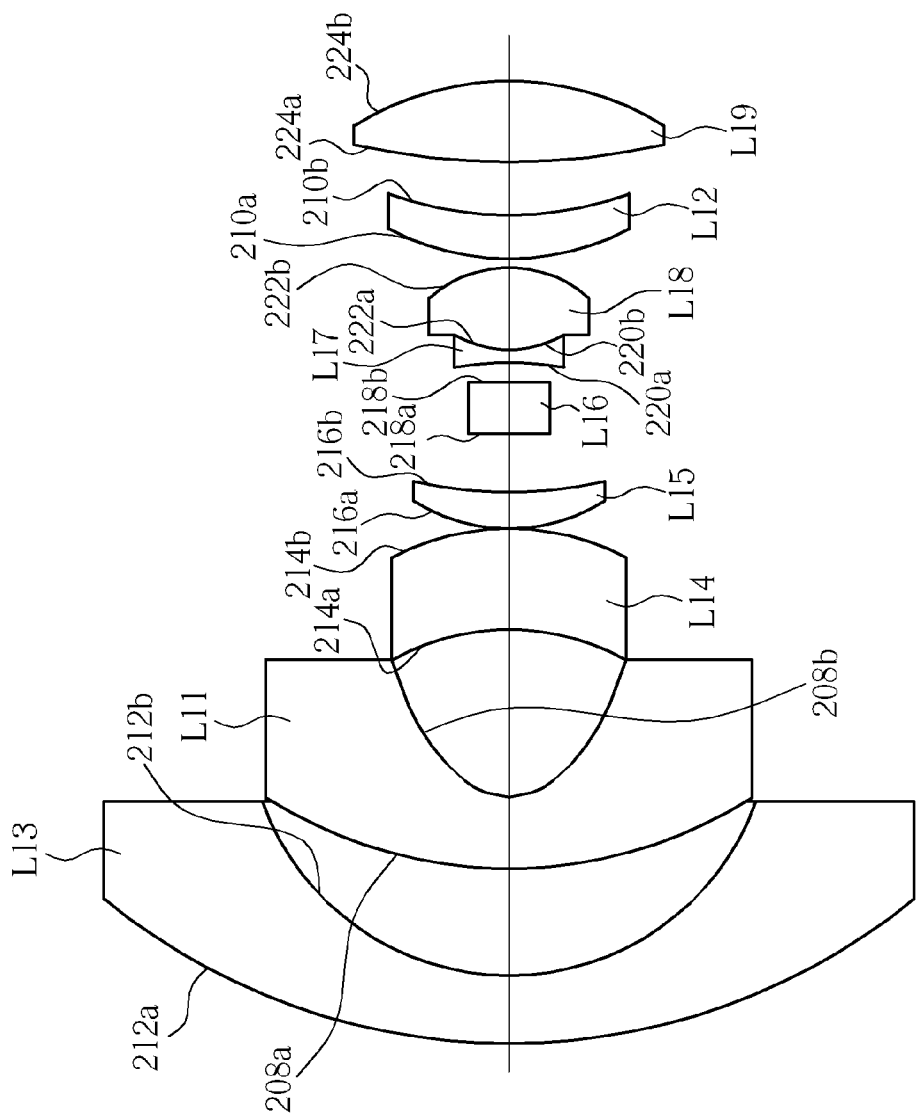
FIG. 8 is a schematic diagram illustrating the first lens group according to this preferred embodiment of the present invention.
Figure 9:
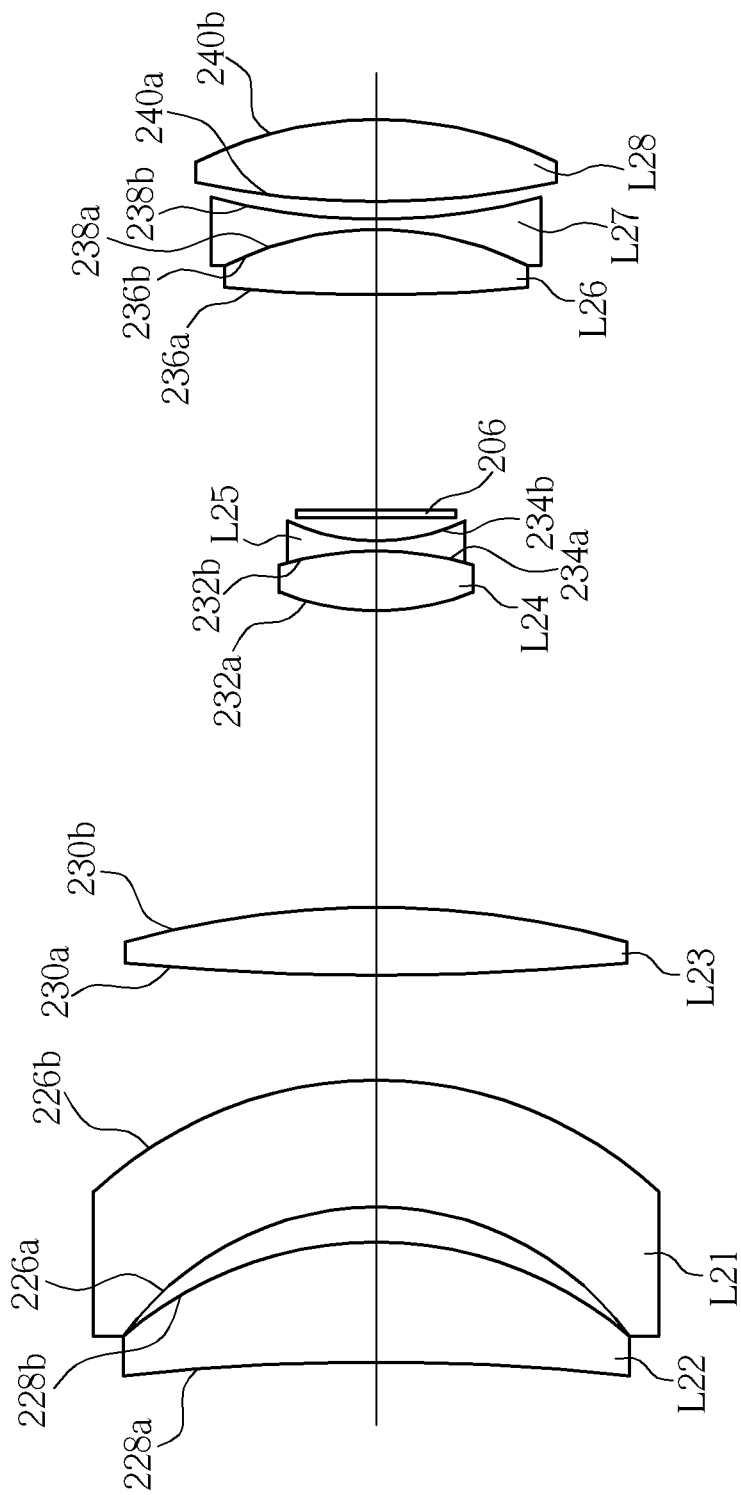
FIG. 9 is a schematic diagram illustrating the second lens group according to this preferred embodiment of the present invention.

In order to detail the first lens group and the second lens group of this embodiment, please refer to FIG. 8 and FIG. 9 together with FIG. 7. FIG. 8 is a schematic diagram illustrating the first lens group according to this preferred embodiment of the present invention, and FIG. 9 is a schematic diagram illustrating the second lens group according to this preferred embodiment of the present invention. As shown in FIG. 7 through FIG. 9, in this embodiment, the first lenses L1 includes two first aspherical lenses L11, L12, and seven spherical lenses L13, L14, L15, L16, L17, L18, L19. An arranged sequence of the first lenses L1 from a side of the first lenses L1 close to the projection screen 104 to a side of the first lenses L2 close to the second lens group 118 is the spherical lens L13, the first aspherical lens L11, the spherical lens L14, the spherical lens L15, the spherical lens L16, the spherical lens L17, the spherical lens L18, the first aspherical lens L12, and the spherical lens L19. The first aspherical lens L11 is a second one of the first lenses L1 as counted from a side of the first lenses L1 close to the projection screen 104, and the first aspherical lens L12 is a second one of the first lenses L1 as counted from a side of the first lenses L1 close to the second lens group 118. The first aspherical lens L11 is a convex-concave lens, and has a convex lens surface 208a facing the projection screen 104 and a concave lens surface 208b facing the second lens group 118. The first aspherical lens L12 is a convex-concave lens, and has a convex lens surface 210a facing the projection screen 104 and a concave lens surface 210b facing the second lens group 118. Also, the convex lens surfaces 208a, 210a and the concave lens surfaces 208b, 210b of the first aspherical lenses L11, L12 are aspherical lens surfaces, and at least one of the first aspherical lenses L11, L12 is constituted by plastic, but the present invention is not limited herein. The spherical lens L13 is a convex-concave lens, and has a convex lens surface 212a facing the projection screen 104 and a concave lens surface 212b facing the second lens group 118. The spherical lens L14 is a concave-convex lens, and has a concave lens surface 214a facing the projection screen 104 and a convex lens surface 214b facing the second lens group 118. The spherical lens L15 is a convex-concave lens, and has a convex lens surface 216a facing the projection screen 104 and a concave lens surface 216b facing the second lens group 118. The spherical lens L16 is a double convex lens, and has a convex lens surface 218a facing the projection screen 104 and a convex lens surface 218b facing the second lens group 118. The spherical lens L17 is a double concave lens, and has a concave lens surface 220a facing the projection screen 104 and a concave lens surface 220b facing the second lens group 118. The spherical lens L18 is a double convex lens, and has a convex lens surface 222a facing the projection screen 104 and a convex lens surface 222b facing the second lens group 118. The convex lens surface 222a of the spherical lens L18 and the concave lens surface 220b of the spherical lens L17 coincide with each other. The spherical lens L19 is a double convex lens, and has a convex lens surface 224a facing the projection screen 104 and a convex lens surface 224b facing the second lens group 118.

In this embodiment, the second lenses L2 includes a second aspherical lens L21 and seven spherical lenses L22, L23, L24, L25, L26, L27, L28. An arranged sequence of the second lenses L2 from a side of the second lenses L2 close to the first lens group 116 to a side of the second lenses L2 close to the light valve 112 is the spherical lens L22, the second aspherical lens L21, the spherical lens L23, the spherical lens L24, the spherical lens L25, the spherical lens L26, the spherical lens L27 and the spherical lens L28. The second aspherical lens L21 is a second one of the second lenses L2 as counted from a side of the second lenses L2 close to the first lens group 116. The aperture stop 206 is disposed between the spherical lens L25 and the spherical lens L26, and is close to the spherical lens L25. The second aspherical lens L21 is a concave-convex lens, and has a concave lens surface 226a facing the first lens group 116 and a convex lens surface 226b facing the light valve 112. Also, the concave lens surface 226a and the convex lens surface 226b of the second aspherical lens L21 are aspherical lens surfaces, and the second aspherical lens L21 is constituted by plastic, but the present invention is not limited herein. The spherical lens L22 is a concave-convex lens, and has a concave lens surface 228a facing the first lens group 116 and a convex lens surface 228b facing the light valve 112. The spherical lens L23 is a double convex lens, and has a convex lens surface 230a facing the first lens group 116 and a convex lens surface 230b facing the light valve 112. The spherical lens L24 is a double convex lens, and has a convex lens surface 232a facing the first lens group 116 and a convex lens surface 232b facing the light valve 112. The spherical lens L25 is a double concave lens, and has a concave lens surface 234a facing the first lens group 116 and a concave lens surface 234b facing the light valve 112. The concave lens surface 234a facing the first lens group 116 and the convex lens surface 232b of the spherical lens L24 coincide with each other, and have a same curvature radius. The spherical lens L26 is a double convex lens, and has a convex lens surface 236a facing the first lens group 116 and a convex lens surface 236b facing the light valve 112. The spherical lens L27 is a double concave lens, and has a concave lens surface 238a facing the first lens group 116 and a concave lens surface 238b facing the light valve 112. The concave lens surface 238a facing the first lens group 116 and the convex lens surface 236b of the spherical lens L26 coincide with each other, and have a same curvature radius. The spherical lens L28 is a double convex lens, and has a convex lens surface 240a facing the first lens group 116 and a convex lens surface 240b facing the light valve 112. In this embodiment, the optical datum and the disposition relationships of the lens surfaces of the first lenses L1 of the first lens group 116 and the second lenses L2 of the second lens group 118 are listed in Table 2, but the present invention is not limited thereto. In Table 2, a number of a thickness represents a distance between a lens surface of the row and a lens surface of the next row. A number of a refractive index represents a refractive index of a medium between a lens surface of the row and a lens surface of the next row. An Abbe number represents an Abbe number of the medium between a lens surface of the row and a lens surface of the next row.

TABLE 2

| Lens | Lens surface | Curvature radius (mm) | Thickness (mm) | Refractive index | Abbe number |
|---|---|---|---|---|---|
| L13 | 212a | 52.06606 | 5.272504 | 1.68958 | 56.7979 |
|  | 212b | 21.30475 | 8.367978 |  |  |
| L11 | 208a | 31.26146 | 5.948414 | 1.525279 | 55.9508 |
|  | 208b | 4.786218 | 13.76557 |  |  |
| L14 | 214a | −21.69245 | 7.906239 | 1.832965 | 37.303 |
|  | 214b | −21.53599 | 0.1 |  |  |
| L15 | 216a | 13.91317 | 3.177834 | 1.775537 | 40.4331 |
|  | 216b | 40.85748 | 4.47584 |  |  |
| L16 | 218a | 42.27139 | 4.368551 | 1.67094 | 57.9395 |
|  | 218b | −30.91106 | 1.5127097 |  |  |
| L17 | 220a | −12.24696 | 0.9066472 | 1.822245 | 24.4584 |
|  | 220b | 9.536797 | 0 |  |  |
| L18 | 222a | 9.536797 | 6.546637 | 1.619947 | 61.0037 |
|  | 222b | −10.67999 | 0.722571 |  |  |
| L12 | 210a | 18.43627 | 3.557267 | 1.525279 | 55.9508 |
|  | 210b | 90.93849 | 4.411336 |  |  |
| L19 | 224a | 55.93953 | 6.356561 | 1.587741 | 62.6511 |
|  | 224b | −24.6997 | 37.074038 |  |  |

TABLE 2-continued

| Lens | Lens surface | Curvature radius (mm) | Thickness (mm) | Refractive index | Abbe number |
|---|---|---|---|---|---|
| L22 | 228a | −129.7242 | 8.71868 | 1.729012 | 54.6909 |
|  | 228b | −28.94021 | 2.42097 |  |  |
| L21 | 226a | −23.69624 | 9.86332 | 1.525279 | 55.9508 |
|  | 226b | −27.87469 | 7.582576 |  |  |
| L23 | 230a | 131.1792 | 5.283994 | 1.729005 | 54.6986 |
|  | 230b | −67.72005 | 22.16469 |  |  |
| L24 | 232a | 19.61797 | 4.477494 | 1.739269 | 52.001 |
|  | 232b | −24.64388 | 0 |  |  |
| L25 | 234a | −24.64388 | 0.65 | 1.764658 | 28.4861 |
|  | 234b | 12.0476 | 2.370708 |  |  |
| Aperture stop |  |  | 16.06013 |  |  |
| L26 | 236a | 125.8047 | 4.929989 | 1.72901 | 54.6971 |
|  | 236b | −22.14781 | 0 |  |  |
| L27 | 238a | −22.14781 | 0.65 | 1.571647 | 41.8053 |
|  | 238b | 43.51427 | 1.484429 |  |  |
| L28 | 240a | 72.23517 | 5.872331 | 1.834 | 37.2 |
|  | 240b | −29.12338 | 5.2 |  |  |

In addition, the convex lens surfaces 208a, 210a and the concave lens surfaces 208b, 210b of the first aspherical lens L11, L12 and the concave lens surface 226a and the convex lens surface 226b of the second aspherical lens L21 are aspherical lens surfaces, and a surface polynomial of each aspherical lens surface can be expressed by:

$$z = \frac{ar^2}{1 + \sqrt{1 - a^2(b+1)r^2}} + cr^4 + dr^6 + er^8 + fr^{10}$$

wherein z is a sag of each aspherical lens surface; r is an aperture radius of each aspherical lens surface; a is an inverse of a curvature radius of a top of each aspherical lens surface; b is a conical coefficient of each aspherical lens surface; and c, d, e, f are respectively aspherical coefficients of fourth order, sixth order, eighth order and tenth order. The conical coefficients and the aspherical coefficients of the convex lens surfaces 208a, 210a and the concave lens surfaces 208b, 210b of the first aspherical lens L11, L12 and the concave lens surface 226a and the convex lens surface 226b of the second aspherical lens L21 are listed in Table 3, but the present invention is not limited thereto.

TABLE 3

| Lens surface | b | c | D | e | f |
|---|---|---|---|---|---|
| 208a | −0.869414 | −5.6766135e−006 | 6.710797e−009 | 4.5219246e−011 | −9.3797e−014 |
| 208b | −0.874398 | 3.671089e−005 | −6.0716621e−007 | 7.4490543e−009 | 6.54644e−011 |
| 210a | 0 | −3.5239971e−005 | 7.3037958e−008 | −1.3421778e−009 | 4.3058e−011 |
| 210b | 78.14662 | 0.00019375612 | −3.5658397e−007 | −3.8031775e−009 | 3.2154e−011 |
| 226a |  | −5.9692402e−006 | 1.6985499e−008 | −4.2691401e−012 | 5.58868e−015 |
| 226b |  | 7.4073972e−007 | 1.0413515e−008 | 5.5746464e−013 | −5.64818e−015 |

According to the above-mentioned datum, in this embodiment, the effective focal length fe of the projection lens 108 is substantially 4.15 mm, which satisfies the relationship of the effective focal length fe of the projection lens 108 being between 2 mm and 7 mm. Furthermore, the total length of the projection lens 108 in this embodiment is only substantially 240 mm. Accordingly, in this embodiment, not only the projection lens 108 has the effect of super wide angle, but also the total length of the projection lens 108 can be prevented from being increased rapidly.

In summary, the projection apparatus of the present invention uses the design of two-time image formation to form an upright projection image, and the first lens group and the second lens group are disposed on the same optical axis, so that the instability generated from the mirror being disposed off the optical axis can be avoided. Furthermore, the first lens group in the present invention further includes at least two aspherical lenses. Also, the effective focal length of the projection lens is subject to be between 2 mm and 7 mm, and a ratio of the effective focal length of the first lens group and the effective focal length of the projection lens is subject to be less than 2.5. Thus, the projection apparatus can have a characteristic of super wide angle, and the problems of the front lens group being too big and the total length of the projection lens being increased rapidly can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projection apparatus used to project an image on a projection screen, and the projection apparatus comprising:
   an image generation device generating a light with the image, the image generation device having a light valve, and the light being emitted from the light valve; and
   a projection lens, having no mirror, and the projection lens comprising:
      a first lens group, having an optical axis and a first effective refractive index, and the first lens group comprising a plurality of first lenses, wherein the first lenses comprises two first aspherical lenses; and
      a second lens group, having a second effective refractive index, and the second lens group being disposed between the first lens group and the light valve and along the optical axis;
   wherein the light generated from the light valve penetrates through the second lens group and forms an intermediate image between the first lens group and the second lens group, and the intermediate image penetrates through the first lens group to form a projection image on the projection screen, and the light is projected onto the projection screen only through the projection lens;
   wherein a center of the projection image and a center of the light valve are disposed at a first side of the optical axis, a center of the intermediate image is disposed at a second side of the optical axis, and the second side is different from the first side.

2. The projection apparatus according to claim 1, wherein an effective focal length of the projection lens is fe satisfying a relationship expressed by: 2 mm≤fe≤7 mm.

3. The projection apparatus according to claim 2, wherein an effective focal length of the first lens group is fw satisfying a relationship expressed by: fw/fe≤2.5.

4. The projection apparatus according to claim 1, wherein a second one of the first lenses as counted from a side of the first lenses close to the projection screen is one of the first aspherical lenses.

5. The projection apparatus according to claim 1, wherein at least one of the first aspherical lenses is constituted by plastic.

6. The projection apparatus according to claim 1, wherein each first aspherical lens has two aspherical lens surfaces respectively facing the second lens group and the projection screen.

7. The projection apparatus according to claim 1, wherein each first aspherical lens is a convex-concave lens.

8. The projection apparatus according to claim 1, wherein a distance between the intermediate image and the first lens group is less than a distance between the intermediate image and the second lens group.

9. The projection apparatus according to claim 1, wherein the first lens group is a wide angle lens set, and a projection view angle of the projection lens is larger than 120 degrees.

10. The projection apparatus according to claim 1, wherein the second lens group comprises an aperture stop controlling a flux of the light with the image.

11. The projection apparatus according to claim 1, wherein the second lens group comprises a plurality of second lenses, and the second lenses comprises a second aspherical lens.

12. The projection apparatus according to claim 1, wherein the second lens group is a relay lens set.

13. The projection apparatus according to claim 1, wherein a distance between the projection lens and the projection screen is D, and a width of the projection screen is W satisfying a relationship expressed by: $D/W \leq 1$.

14. The projection apparatus according to claim 1, wherein the first effective refractive index is a first positive effective refractive index, and the second effective refractive index is a second positive effective refractive index.

\* \* \* \* \*